United States Patent
Hegenbart et al.

(10) Patent No.: US 10,026,536 B2
(45) Date of Patent: Jul. 17, 2018

(54) HOLDING APPARATUS, MOUNTING SYSTEM, AND METHOD FOR HOLDING COMPONENTS DURING MOUNTING

(71) Applicant: Airbus Operations GmbH, Hamburg (DE)

(72) Inventors: Matthias Hegenbart, Hamburg (DE); Peter Linde, Hamburg (DE); Detlev Konigorski, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 15/348,020

(22) Filed: Nov. 10, 2016

(65) Prior Publication Data

US 2017/0133139 A1   May 11, 2017

(30) Foreign Application Priority Data

Nov. 11, 2015   (DE) .......................... 10 2015 119 434

(51) Int. Cl.
| | |
|---|---|
| *B21D 26/14* | (2006.01) |
| *H01F 7/20* | (2006.01) |
| *H01F 6/06* | (2006.01) |
| *H01F 7/02* | (2006.01) |
| *H01F 7/06* | (2006.01) |
| *B23P 19/10* | (2006.01) |
| *B23Q 3/15* | (2006.01) |

(Continued)

(52) U.S. Cl.
CPC ............. *H01F 7/206* (2013.01); *B21D 26/14* (2013.01); *B23P 19/10* (2013.01); *B23Q 3/15* (2013.01); *B25B 11/00* (2013.01); *H01F 6/00* (2013.01); *H01F 6/06* (2013.01); *H01F 7/0252* (2013.01); *H01F 7/064* (2013.01)

(58) Field of Classification Search
CPC ....... B23Q 3/15–3/1546; B25B 11/002; H01F 7/206; H01F 7/0252–7/0268; B65G 21/2009; B21D 26/14
USPC ........................................ 269/8; 335/285–289
See application file for complete search history.

(56) References Cited

U.S. PATENT DOCUMENTS 9,496,080 B2 *  11/2016  Wilson ...................... H01F 7/20

FOREIGN PATENT DOCUMENTS

| DE | 2059290 A | 9/1973 |
| DE | 102008043490 A1 | 5/2010 |

(Continued)

OTHER PUBLICATIONS

German Search Report, German Search Report for German Patent Application No. 10 2015 119 434.1 dated Oct. 20, 2016.

*Primary Examiner* — Ramon M Barrera
(74) *Attorney, Agent, or Firm* — Lorenz & Kopf, LLP

(57) ABSTRACT

This relates to a holding apparatus for holding a component during mounting. The holding apparatus comprises at least a first holding unit including at least one magnetic field generating device for generating a magnetic field, and at least a second magnetic holding unit spaced apart from the first holding unit in a predetermined distance for receiving the component. A holding force for holding the component between the first holding unit and the second holding unit is generated in the second magnetic holding unit as a result of induction and by means of a magnetic field generated by the magnetic field generating device. The embodiment also comprises a mounting system and a method for holding components by means of such holding apparatuses.

9 Claims, 10 Drawing Sheets

(51) Int. Cl.
*B25B 11/00* (2006.01)
*H01F 6/00* (2006.01)

(56) References Cited

FOREIGN PATENT DOCUMENTS

EP 1132164 A2 9/2001
FR 2722437 A1 1/1996

\* cited by examiner

HOLDING APPARATUS, MOUNTING SYSTEM, AND METHOD FOR HOLDING COMPONENTS DURING MOUNTING

CROSS-REFERENCE TO RELATED APPLICATION

This application claims priority to German Patent Application No. 102015119434.1, filed Nov. 11, 2015, which is incorporated herein by reference in its entirety.

TECHNICAL FIELD

This relates to a holding apparatus, a mounting system, and a method for holding components during mounting. In particular, the embodiment can be used for aircraft construction, without, however, being limited thereto.

BACKGROUND

In various fields of mechanic fabrication, individual components must be held during mounting or assembling prior to being bonded, welded, or screwed to each other. However, the components to be interconnected not just need to be held, but also require a positioning relative to each other prior to interconnecting. In mounting systems, for example in automotive construction and in aircraft construction, it is common practice to grasp the components to be interconnected, to position them, and to hold them until finishing the interconnection process, for example, a welding process. In automotive manufacturing, many components are magnetic, so that a magnetic holding apparatus attached to a robot arm may be used to position and interconnect the components. However, even nowadays in the automotive sector, components are also made of non-magnetic materials so that grasping of the components and their positioning is more difficult in this case. For this purpose, fittings must be affixed, either by bonding or by screwing, and these fittings (holding apparatuses) must be removed later on after interconnecting the components. However, a mechanic intervention in components to be interconnected, which components are made of, for example, fiber reinforced plastics made of carbon fiber reinforced plastic CFK, glass fiber reinforced plastics GFK, with aramid fiber reinforced plastics, or the like, is often necessary.

SUMMARY

It is an object of the embodiment to provide a holding apparatus, a mounting system, and a method for holding components during mounting/fabrication, which enable holding or positioning of components without a mechanic intervention in the component being necessary.

A first aspect of the embodiment relates to a holding apparatus for holding a component during mounting, wherein the holding apparatus comprises at least a first holding unit including at least one magnetic field generating device for generating a magnetic field, and at least a second magnetic holding unit which is arranged at a predetermined distance with respect to the first holding unit for receiving the component, and in which second magnetic holding unit a holding force for holding the component between the first holding unit and the second holding unit can be generated by the magnetic field as a result of induction.

According to the first aspect, the component is inserted between the first and the second holding unit and is held by a force which is induced in the second holding unit by means of induction. Hence, the component may be held between the first and the second holding unit without it being necessary to (invasively) provide holes, attachment arrangements, screws or bolts at the component itself. The mechanical interventions and the mechanical holding forces which are common practice by now are, hence, replaced by magnetic holding forces.

Advantageously, the magnetic field generating device may be a magnet, an electric magnet, or a superconducting magnet. Advantageously, with a superconducting magnet, very high magnetic forces for holding even heavyweight components may be achieved. The second holding unit may, generally, comprise a ferromagnetic material or a superconducting material. A so called Mu-metal (perm alloy) is especially suitable.

It is especially beneficial if the holding force is an attraction force, wherein in this case the component is clampable by means of the attraction force between the first holding unit and the second holding unit. According to a further advantageous embodiment of the embodiment, the first holding unit and the second holding unit comprise shaped surfaces, so that a shaping may be likewise achieved when clamping the component. For example, the first holding unit and/or the second holding unit may comprise a curved surface, so that an even component may be shaped in a predetermined curved shape. It is, however, also possible that the component itself is preshaped and that the first holding unit and the second holding unit comprise surface shapes adapted to the component. Thus, a curved or bent component may be held without any additional deformation and, in particular, the component is held areal and not punctiform.

According to a further advantageous embodiment, it is also possible that the second holding unit contacts the component only at one site and that the first holding unit is spaced apart from the component. Thus, the component can be laid in a simple way onto the second holding unit where it rests against due to its own force of gravity, wherein the spaced apart first holding unit may hold/move and position the arrangement of the second holding unit with the component. In case a superconductor is used, this may be accomplished by means of the principle of "frozen flux".

Especially advantageous is using of the holding apparatus if the component is a hollow component, wherein in this case multiple holding apparatuses may be provided at the inner circumference and multiple magnetic field generating devices may be arranged spaced apart from the outer circumference of the hollow component and all around the outer circumference. Thus, hollow components may be held/moved and positioned in an advantageous manner.

It is furthermore advantageous if a control device is provided which controls the magnetic field generating device as to adjust the intensity and the direction of the generated magnetic field. For example, especially for that case of the previously mentioned hollow component, individual magnetic field generating devices may generate magnetic fields of different intensity and direction, so that a shaping of the component as well as an exact positioning is enabled.

A second aspect of the embodiment relates to a mounting system which comprises one or more mounting arrangements which are connected with the first holding unit or with the first holding units, respectively. Thus, for example, large-scale components like areal components or fuselage components in the aircraft fabrication may be magnetically held (by means of the holding forces) at multiple positions, wherein a positioning is also possible. Hence, components may be positioned onto a magnetic holder (which represents the second holding unit), for example. The magnetic holder may be a magnetic cylinder onto which a curved component is placed. The curvature of the component may be predefined or the component may be brought into a predefined shape of the magnetic holder (e.g. of a magnetic cylinder) in a targeted manner by means of the holding apparatuses which are connected with the mounting arrangements.

It is further advantageous if the magnetic field generating devices are controlled by the control arrangement so that they can generate an attraction force or a repulsive force. Hence, in particular in the previously described case according to which the magnetic field generating devices are arranged around an outer circumference of a hollow component (and a multitude of second holding arrangements are arranged at the inner circumference of the hollow component), a shaping of a hollow component with closed surface may be simply achieved. Depending on a desired surface shaping correction, individual magnetic field generating devices may exert an attraction force while other magnetic field generating devices exert a repulsive force onto the surface of the hollow component.

A third aspect of the embodiment relates to a method for holding components according to which a component is first arranged between the first holding unit and the second holding unit of a holding apparatus, wherein the first holding unit comprises a magnetic field generating device, the magnetic field of which induces a holding force in the second magnetic holding unit. Subsequently, the intensity and/or the direction of the magnetic field generated by the magnetic field generating device is controlled so that the component is held during mounting by means of the generated holding force. Thus, punctiform loads may be prevented when holding the component.

One or more magnetic field generating devices may be controlled such that not just holding and positioning of the components is enabled but also shaping may be accomplished. Shaping may be accomplished in an advantageous manner as a result of the holding units having specific geometric shapes to which the component adapts during holding. Alternatively, shaping may be accomplished as a result of the component being held at multiple points with multiple holding apparatuses and different magnetic fields and, hence, holding forces of different intensity are generated.

Further advantageous embodiments and improvements are indicated the dependent claims.

BRIEF DESCRIPTION OF THE DRAWINGS

Further features, advantages and application possibilities of the present embodiment can be derived from the following description of exemplary embodiments in connection with the drawings. Thereby, all described and/or visually depicted features and steps for themselves and in any combination form the subject matter of the embodiment independent of their combination in the individual claims or their dependencies. Reference signs in the claims and in the description do not limit the scope and serve only for illustration.

Furthermore, in the drawings, same reference signs indicate same or similar objects and steps.

FIG. 2-1 depicts a holding apparatus HV with curved surfaces for holding a component 21, according to an advantageous embodiment;

FIG. 2-2 depicts a holding apparatus HV where a component 21 is clamped between a first and a second holding unit 11, 31, according to an advantageous embodiment;

FIG. 3-1 illustrates positioning and holding of multiple components T11-T13 and T21-T23 by means of multiple holding apparatuses which are connectable with mounting arrangements M1, M2;

FIG. 3-2 is a cross sectional view of FIG. 3-1 along the section line A-A', wherein a shaping in a curved form is accomplished by the holding apparatuses;

FIG. 4-1 illustrates holding or positioning of a curved component 2 by means of a mounting arrangement M3 and holding apparatuses HV;

FIG. 4-2 illustrates placing of curved components onto a curved cylinder MS according to an advantageous embodiment;

FIG. 9-1 and FIG. 9-2 are representations of conventional holding apparatuses which are used in aircraft production.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
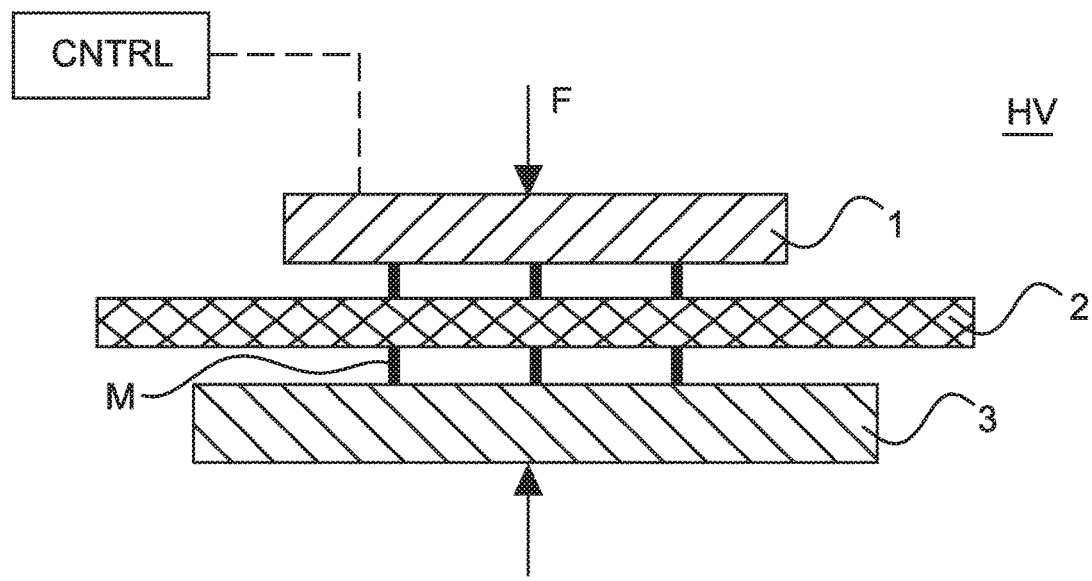
FIG. 1 depicts a holding apparatus HV which holds a component 2, according to the principle of the present embodiment.
Figures 1, 2:
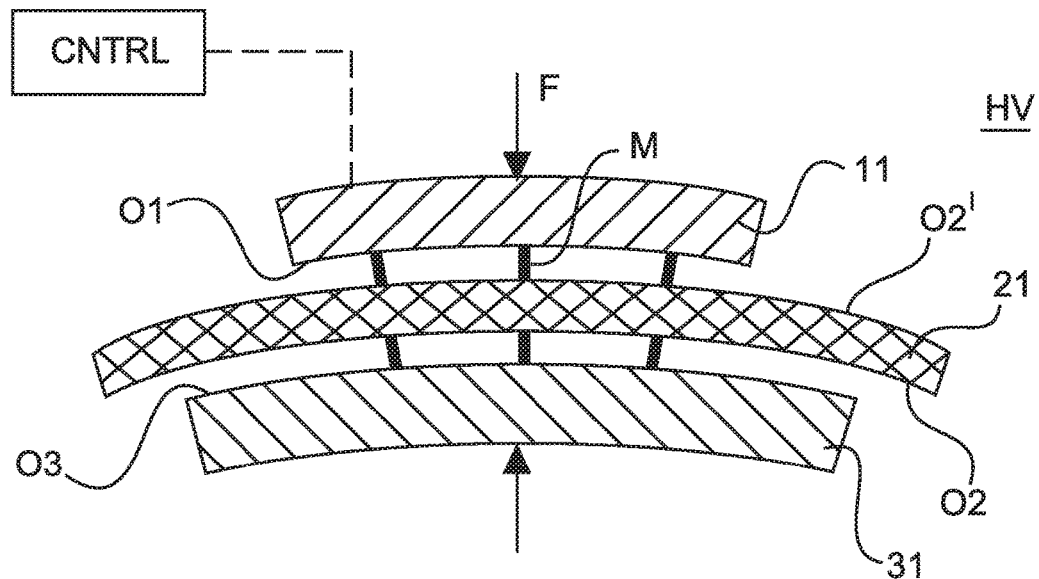
Figure 2:
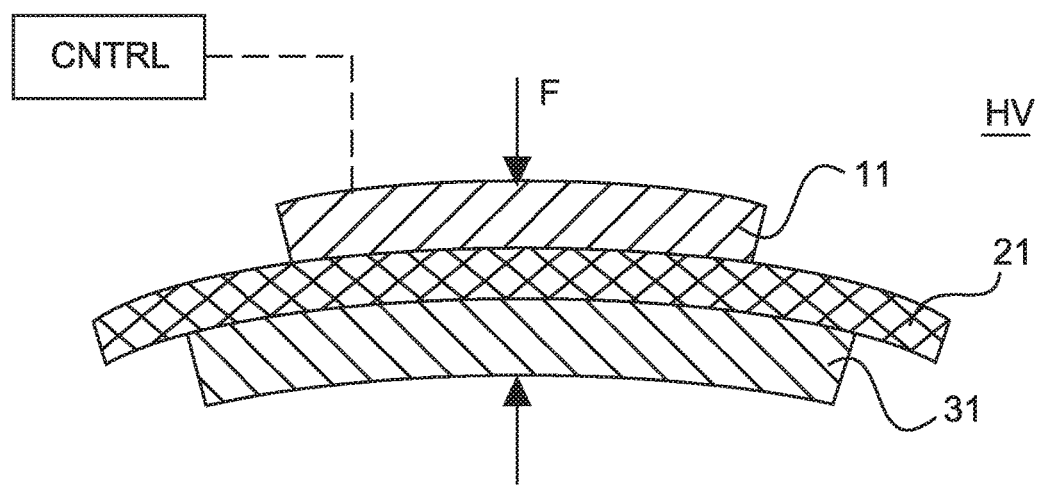
Figures 1, 9:
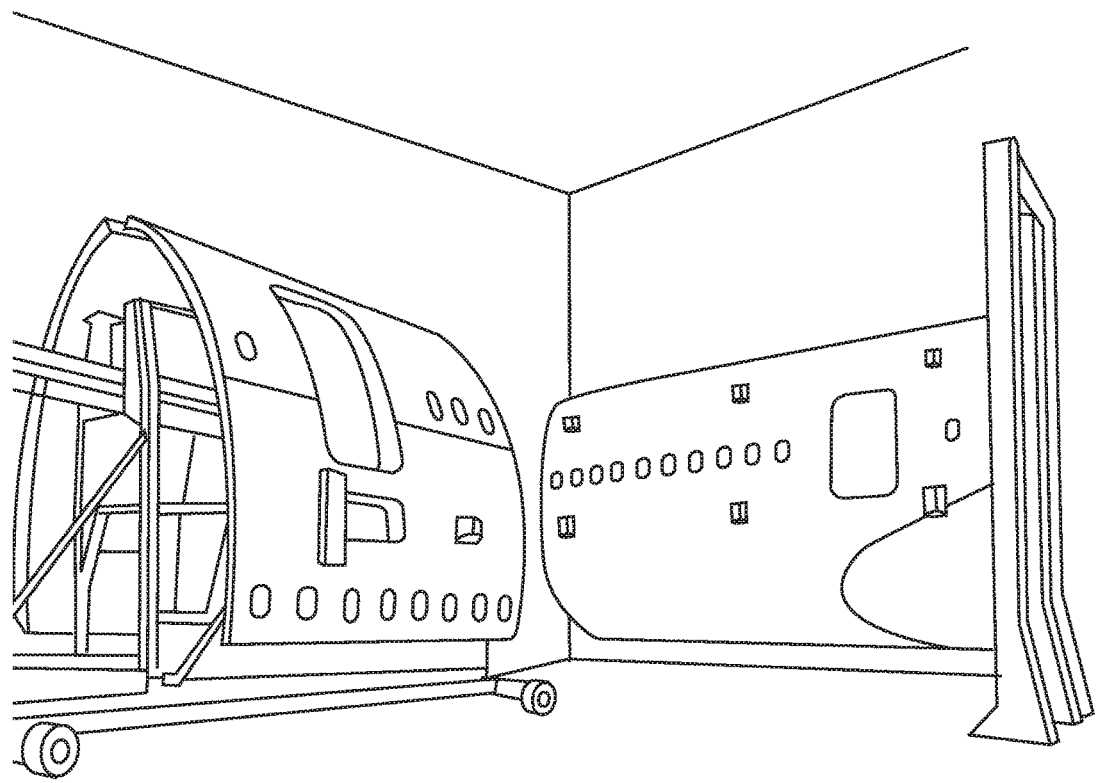
Figures 2, 9:
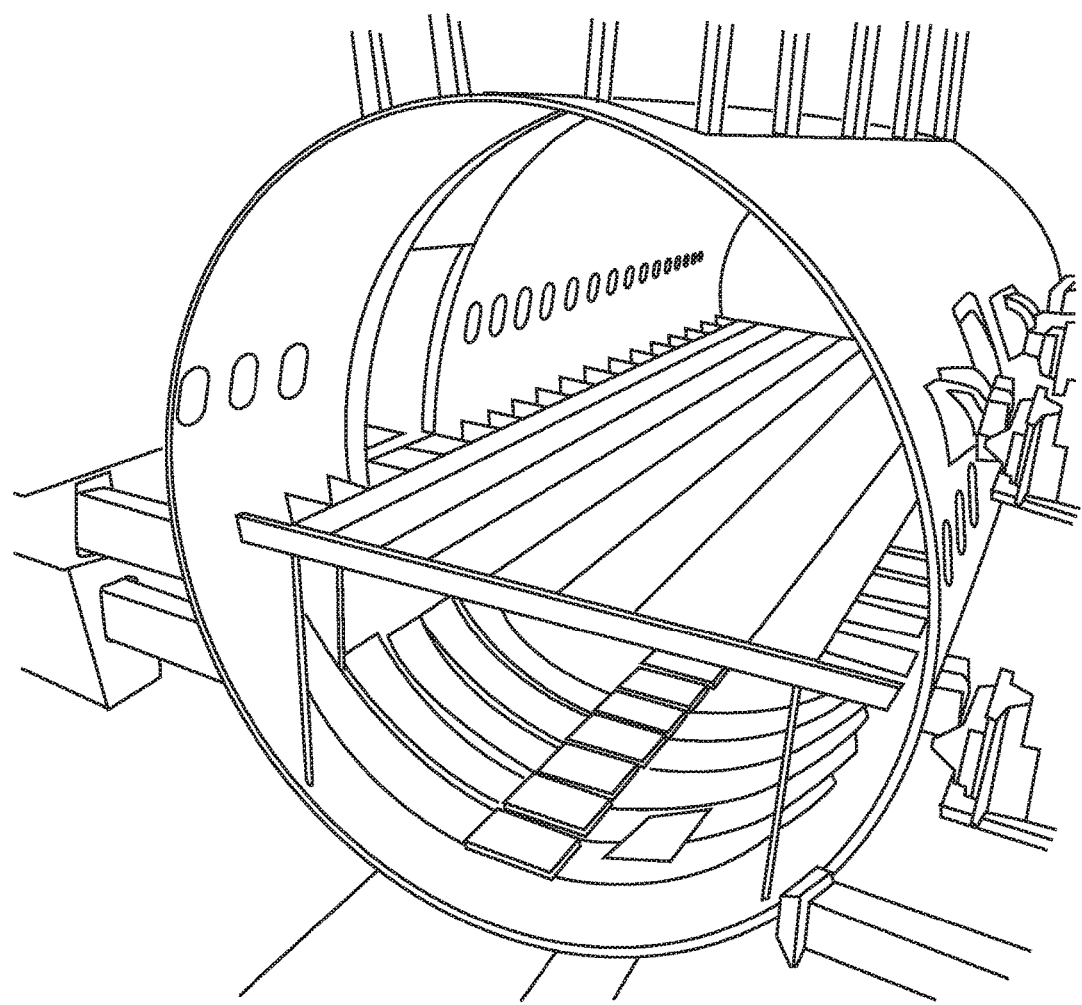

As an example for the holding apparatuses used in aircraft production, FIG. 9-1 shows a typical fuselage segment at which individual fittings are affixed. FIG. 9-2 shows how individual robot arm grasp at the fittings and, thereby, accomplish positioning of the individual components (fuselage segments) themselves but also with respect to each other. As can be derived from FIG. 9, not only drilling through of the casing is necessary as to screw on a counterpart for affixing the fittings, but the entire fuselage segment is held at individual points.

As indicated above, it is the aim of the present embodiment, that no mechanic interventions are taken at the components which have to be held, moved, and positioned during mounting, such as it is required in the prior art. The embodiment replaces the mechanic forces by magnetic forces, so that no intervention is required at the component. Independent of the component being curved or even/flat or being provided with a specific shape, the component is placed between a first and a second holding unit between which a magnetic force is induced. This magnetic force which is induced between the first and the second holding unit holds the component like a magnetic clamp without any interventions at the component being required.

FIG. 1 shows this principle of the embodiment. The holding apparatus HV according to the embodiment comprises a first holding unit 1 at one side of the component 2 (which is exemplary shown in the representation of FIG. 1 as a component having a flat surface) and at the other side of the component 2 a second, preferably magnetic, holding unit 3. The first holding unit 1 contains at least one magnetic field generating device for generating a magnetic field M towards the second holding unit 3. A holding force F for holding the component 2 between the first holding unit 1 and the second holding unit 3 is generated in the second holding unit 3 by means of induction. The first holding unit 1 and the second holding unit 3 are spaced apart from each other so that the component 2 to be held can be arranged in between.

Figure 7:
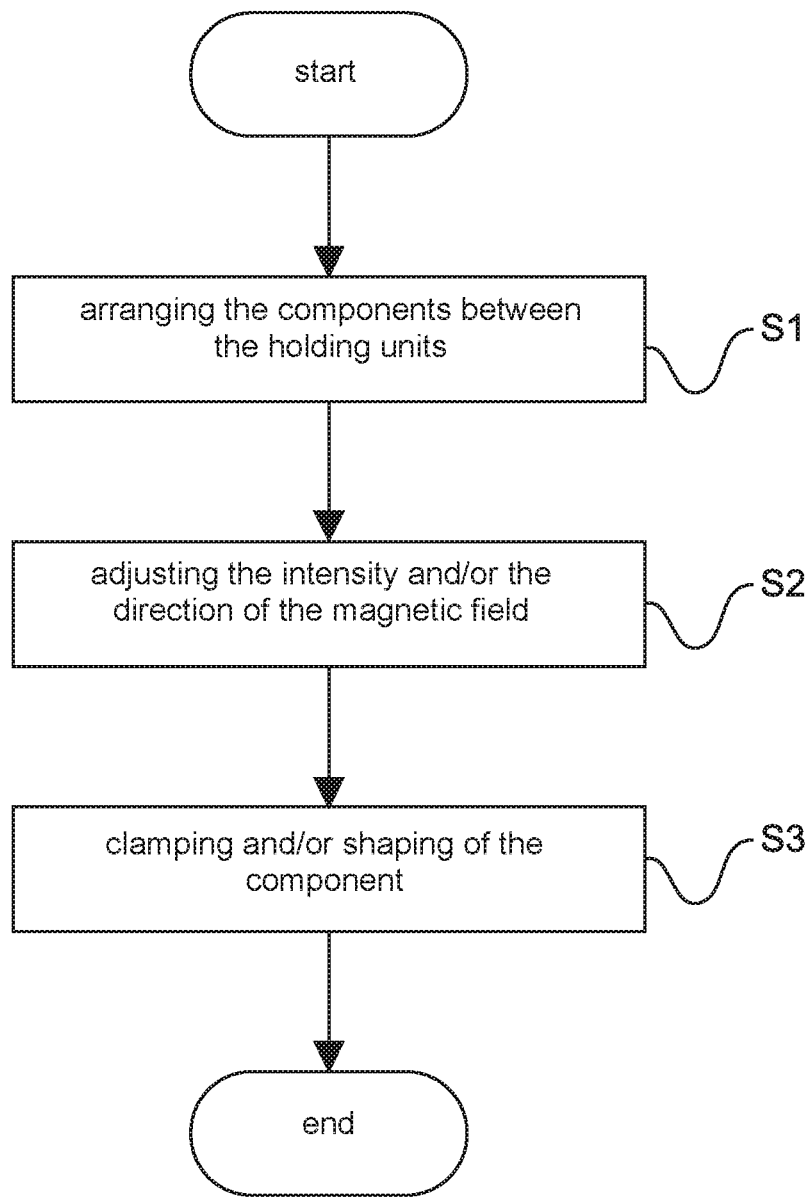
FIG. 7 is a flow chart of the holding method according to an advantageous embodiment.

According to the method for holding the component 2 shown in FIG. 7, the component 2 is first arranged between the holding units 1, 3 in step S1 and in step S2, the size and/or the direction of the magnetic field M generated by the magnetic field generating device 1 is adjusted. In a step S3, the component 2 may then be clamped between the first holding unit 1 and the second holding unit 3 as is shown in principle in FIG. 2-2 (in the event of curved surfaces).

It is also possible, as shown in FIG. 2-1, that the component 2 is merely laid (stored or stocked) onto a second holding unit 3 while the first holding unit 1 with the magnetic field generating device 1 is arranged at a distance from the upper surface of the component 2. A holding force F is also exerted in this case, wherein it is not required that the component 2 is explicitly clamped. In an advantageous manner, if a superconductor is used, the component 3 may be held by means of the principle of "frozen flux" according to the principle of Meissner-Ochsenfeld. This means that the magnetic field generating device 1 generates a magnetic field of a specific intensity and the superconductor cooled down below the critical temperature freezes the magnetic field so that the component laid upon floats under the magnetic field generating device.

As can be easily recognized in FIG. 1, FIG. 2-1, and FIG. 2-2, according to the embodiment it is not required to mechanically affix holes, attachment arrangements, screws or bolts or other fittings at the component 2 as the component 2 is held by the two holding units 1, 3 described above and below by means of magnetic force. Thus, a flexible, semi-automated or complete automated fabrication may take place, even if tight tolerances must be taken into account.

In step S2 in FIG. 7, the control arrangement CNTRL controls the intensity and/or the direction of the magnetic field. This is especially advantageous if the component 2 is held by multiple holding apparatuses HV according to the design shown in FIG. 1. For example, the control arrangement may adapt the intensity and/or direction of the magnetic field to different thicknesses of the component 2 at different positions. Adjusting the intensity and/or direction of the magnetic field of individual holding apparatuses HV is advantageous also when holding and positioning hollow components with closed surfaces, as will be described in the following with reference to the advantageous embodiment in FIG. 5 and FIG. 8.

As can be derived from FIG. 1, the second holding unit 3 must be made of a material which enables inducing a holding force (magnetic force) in case of an influence of the magnetic field sent out by the magnetic field generating device 1. In general, the second holding unit is made of a material which comprises Mu-metal. Preferably, it may be a ferromagnetic material. Paramagnetic, diamagnetic, and superconducting magnetic materials are possible. In case the material is ferromagnetic, the interaction with the magnetic field will always generate an attraction force. However, if the material of the second holding unit 2 is superconducting, it is also possible that a repulsive force is generated. Strong magnetic fields may be generated with a superconducting magnet 1. It is, however, also possible that the magnetic field generating device 1 is a simple magnet or an electric magnet which can generate a magnetic field having sufficient intensity and direction so that a magnetic field is generated which is sufficient with regard to the weight and the possible required shaping of the component.

Preferably, the material of the component 2 is carbon or fiber reinforced plastic as, for example, carbon fiber reinforced plastic, plastics reinforced with aramid fibers, etc., which do not impede the magnetic field generated by the magnetic field generating device. Although the component 2 is preferably completely non-magnetic, it is conceivable that the component 2 is only slightly magnetic, as long as the magnetic field M generated by the magnetic field generating device 1 is strong enough to induce a sufficient holding force F in the second magnetic holding unit 3.

It can be easily seen that a holding apparatus HV as is shown in FIG. 1, provides significant advantages in particular in aircraft construction, for example, for holding and positioning of components of an aircraft, as individual fuselage segments, even or curved linings, a wing, or an elevator or a vertical stabilizer. With the present embodiment and as a consequence of the holding apparatus HV, no mechanic intervention in the aircraft component is required. Furthermore, it is possible to hold the components along their area, for example with plate-shaped second holding units as to avoid punctiform loads.

As the component 2 is preferably made of non-magnetic material (Mu-metal) as carbon, plastic, or sheet metal, the principle of "frozen flux" can be used for generating a holding force, as described previously, if a superconductor is used in the magnetic field generating device 1 or in the second holding unit 3. As known to the person skilled in the art since acquaintance of the Meissner-Ochsenfeld principle, a superconductor not just changes its conductivity below the transition temperature but it may also store or "freeze" the magnetic field, for example of a permanent magnet, at a previously defined distance. For example, if one places a non-magnetic spacer (component) between magnet and superconductor, cools down the latter to its transition temperature, and removes the spacer, the superconductor subsequently stoutly floats or hovers above the magnet. If one tries to displace the superconductor, it always moves back to the stored position. It is conceivable that the second holding unit 3 is a superconductor cooled down to its transition temperature, so that the first holding unit (a magnet) and the second holding unit which is a superconductor are coupled in a friction lock in a contactless manner via the "frozen" magnetic field. Thereby, the component 2 may be simply laid onto the holding unit 3, or may be clamped in between, as shown in FIG. 2-2 (with even or curved surfaces).

This may be especially advantageous in aircraft production. As the first holding unit 1 and the second holding unit 3 can be coupled in a force-fitting manner via the "frozen flux" at a predetermined distance, the entire holding apparatus HV may simply be laterally slid onto the component 2 and then be raised so that the component 2 rests upon the second holding unit 2 and hovers below the first holding unit. This is especially advantageous for inaccessible portions at the component in case a preceding attachment of the second holding unit 3 at the component 2 (similar to what it shown in FIG. 2-1) is not possible. Usage of the "frozen flux" principle is not just applicable to the embodiment shown in FIG. 1 but also to all the advantageous embodiments described hereinafter.

FIG. 2-1 shows an embodiment of the embodiment in which the contact surfaces O1 and O3 of a first holding unit 11 and of a second holding unit 31 have a predetermined shape. Such a predetermined shape may be, for example, a curved surface, while other desired surface shapes are also possible. In FIG. 1 and also in FIG. 2-1, the component 2-1 is arranged between the two holding units 11 and 31 and a magnetic field M is generated. As shown in FIG. 2-2, the holding force F is generated by means of induction and the component 21 is clamped between the first holding unit 11 and the second holding unit 31 with the curved surfaces O1, O3. In FIG. 2-1, the component 21 is shown with a curved surface O2, wherein the surface O3 of the second holding unit 31 is adapted to the surface O2 for holding. Likewise, the upper surface O2' is adapted (adapted in terms of the shape) to the surface O1. Curved components 21 can be held with the curved surfaces O1, O3. However, the lower surface O2 may also differ from the upper surface O2' in terms of their shape.

In FIG. 2-1, the component 21 is shown so that it has curved surfaces, wherein holding is accomplished as shown in FIG. 2-2 when the magnetic field is generated. However, it is also possible that the component 21 has even surfaces, as the component 2 in FIG. 1 does. If, in turn, the surface O1 and the surface O3 of the first holding unit 11 and of the second holding unit 13 have specifically designed surfaces, for example curved surfaces (wherein these need not have the same curvature), a shaping may be accomplished if the even component 2 (or, in general, a component 2 with surfaces O2, O2', which are not adapted to the surfaces O1, O3) is clamped between the holding units (11, 31), as shown in FIG. 2-2. Thus, for example an even component 2 may be provided with a desired shape by the curved surfaces prior to the component being positioned.

Moreover, as already elucidated with reference to FIG. 1 above, it is not necessarily required that the component is clamped. Thus, the holding unit 11 may be arranged spaced apart from the holding unit 31 and only the holding unit 31 may have a curved surface O3 so that the even component 2 experiences a shaping due to its own weight and the areal holding by means of the second holding unit 31. This is referred to as "contactless magnetic shaping method".

Figures 1, 3:
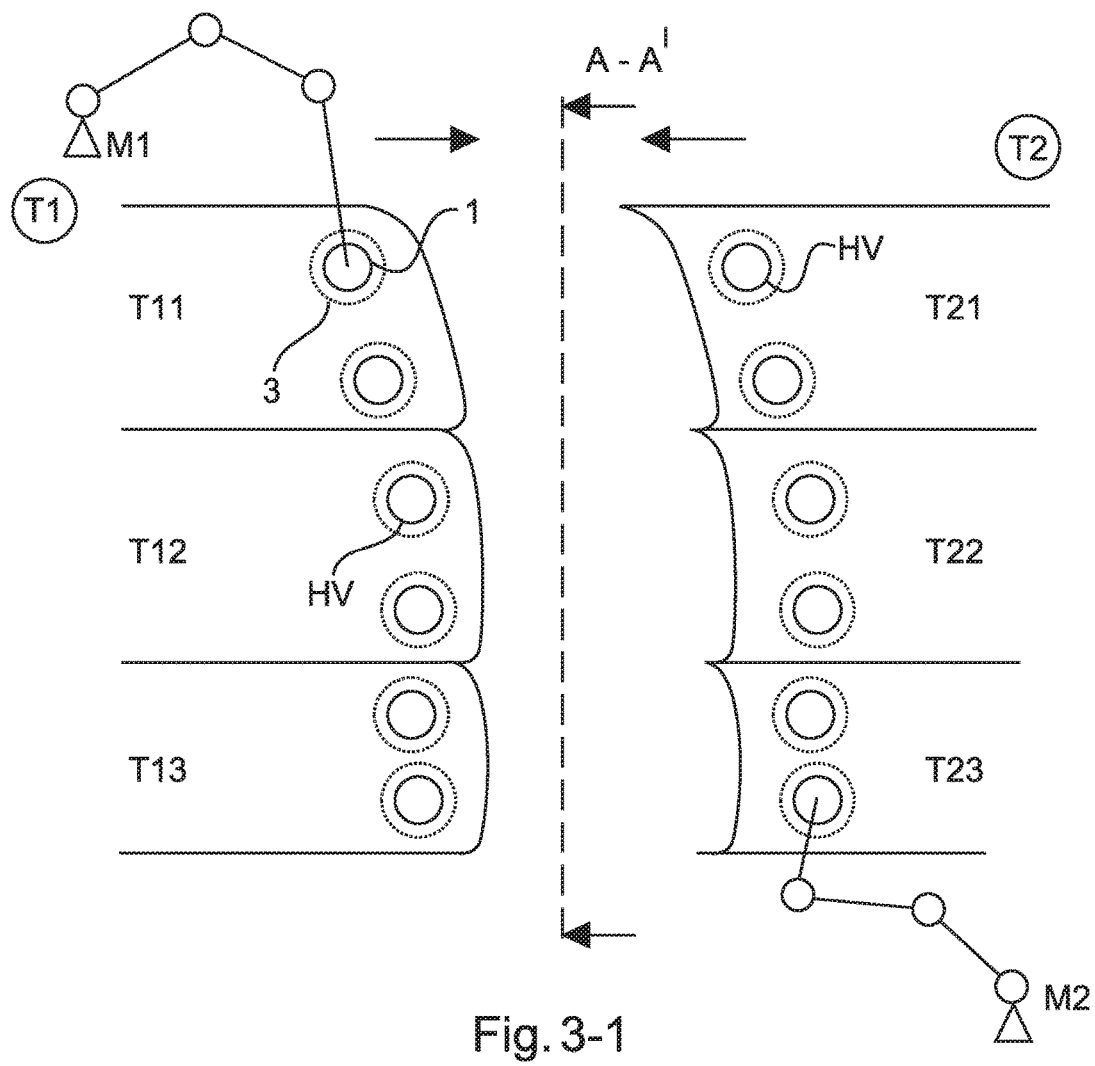
Figures 2, 3:
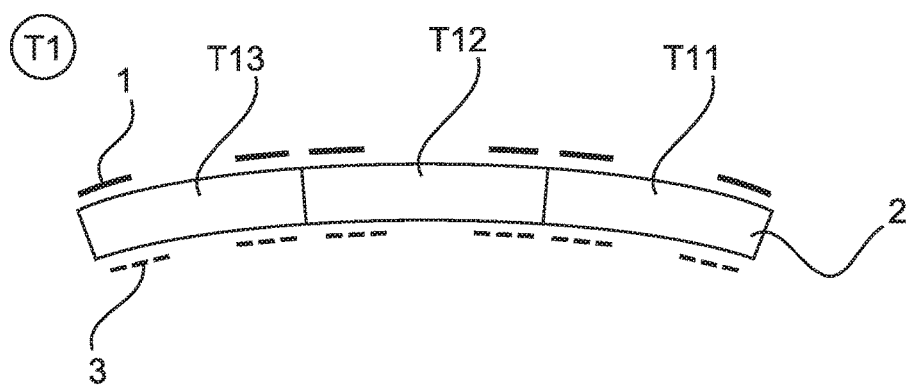

A further advantageous embodiment which enables positioning as well as shaping is shown in FIG. 3-1 and FIG. 3-2. FIG. 3-1 shows how multiple individual components T11, T12, T13 are held with multiple holding apparatuses HV, each of which comprises a first holding unit 1 and a second holding unit 3 which are arranged (in the top view of FIG. 3-1) above and below the components T11, T12, and T13. Furthermore, FIG. 3-1 shows a mounting arrangement M1 which is advantageously designed as a robot. The robot arm may be configured such that it can grasp at any holding apparatus HV or multiple holding apparatuses HV. Of course, it is also possible that multiple mounting arrangements grasp at multiple holding apparatuses HV.

FIG. 3-1 shows, as an example, parts of an areal piece in aircraft assembly. The already connected parts T11-T13 are held and are connected with a second areal piece consisting of the components T21-T23 which are likewise provided with holding apparatuses HV. In turn, a mounting arrangement M2, for example a robot arm, grasps at the holding apparatuses HV so that the areal pieces (components) T1 and T2 may be held, moved, positioned, and connected. Thus, a mounting system, as exemplarily shown in FIG. 3-1, comprises multiple mounting arrangements M1, M2, and one or multiple holding apparatuses HV.

In FIG. 3-1 it is assumed that the components T1 and T2 have an even cross section so that holding at only one point or at multiple points (holding apparatuses) must cause a shaping. However, it is also possible, as shown in FIG. 3-2 which here shows a view of the cross section A-A' of FIG. 3-1, that the individual components T13, T12, and T11 of the component T1 are either held by the individual holding units 1, 3 so that a shaping (curved shape in the cross section) is generated due to the own weight or in such a manner that the second holding units 3 and/or the first holding units 1 comprise surfaces with specific geometries, as explained above with reference to FIG. 2-2. For example, it may be advantageous if the second holding units 3 are formed as larger curved plates which hold individual parts T12, T12, and T11, respectively, wherein a curvature or any desired shaping may be accomplished as a result of clamping with first holding units 1 arranged at the upper surface. Thus, for example in case the components T1 and T2 which are to be connected are parts of an aircraft wing, it may be advantageous to compensate different curvature of the pre-curved areal pieces 2 by either providing holding apparatuses HV at specific positions or by clamping the already pre-shaped cross section between holding units which have specific surface shapes. Thus, even in FIG. 3-1, not only holding but also shaping in cross section may be accomplished.

As can be seen particularly in FIG. 3 (FIG. 3-1 and FIG. 3-2) for aircraft production, according to the embodiment, aircraft components may be safely positioned at a predetermined position and magnetic holding and assembling components may be accomplished without the components themselves being equipped with additional arrangements and hardware which must be carried during flight. However, as to enable maintenance (for example, unscrewing and screwing again of fuselage segments) in the conventional example of FIG. 9, fittings are typically left in the aircraft component, as described above. This is not necessary for the embodiment and, thus, results in reduction of weight. For example, according to the embodiment, in case of the fuselage parts of FIG. 9, an arrangement according to FIG. 3 may be chosen so that numerous second holding units are provided at the inner circumference of fuselage parts. Mounting may then be accomplished such that a first holding unit simply grasps at a desired position at the fuselage outer shell by means of the mounting arrangement M1 or M2 without it being evident for the mounting arrangement from outside where exactly the second holding unit is arranged. Just like this, in case of an aircraft wing, the robot arm M1 or M2 which is equipped with a first holding unit may grasp at any desired position at which a second holding unit is provided below at a desired position. Thus, the holding force may be applied "through closed walls" of the aircraft parts without an access to the interior space or to the other side is necessary. Thus, it is also not required letting the holding forces mandatorily grasp at the connection points, but also at bigger distance therefrom.

As described, the second holding unit 3 may be designed punctiform or areal. Even in terms of the area it must not have the same size as the size of the magnetic field generating device 1 of the first holding unit. Depending on the use case, a more punctiform or a more areal design of the first and second holding unit is advantageous. As the magnetic field is effective in an areal manner, it is also not required to do an exact positioning between the first holding unit 1 and the second holding unit 3, in particular, if the second holding unit 3 is designed along a larger area. Thus, it is merely necessary to provide larger Mu-metal plates at multiple positions at an aircraft wing bottom part, for example, and a robot arm (mounting arrangement) M1 with a first holding unit with significantly smaller surface may effect inducing a holding force and, thus, holding, at any position opposite to the second holding unit 3 which is formed as a large area.

Figures 1, 4:
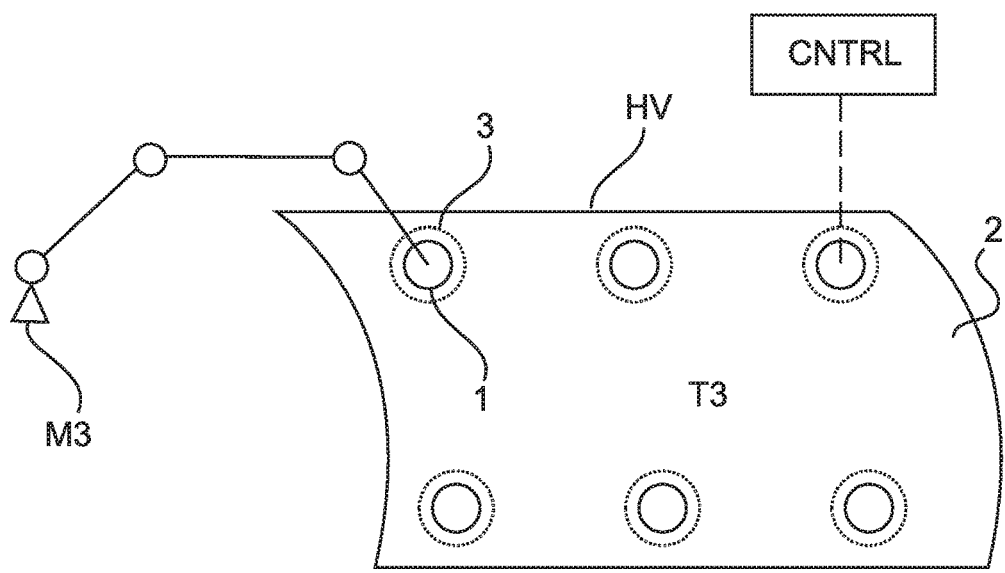
Figures 2, 4:
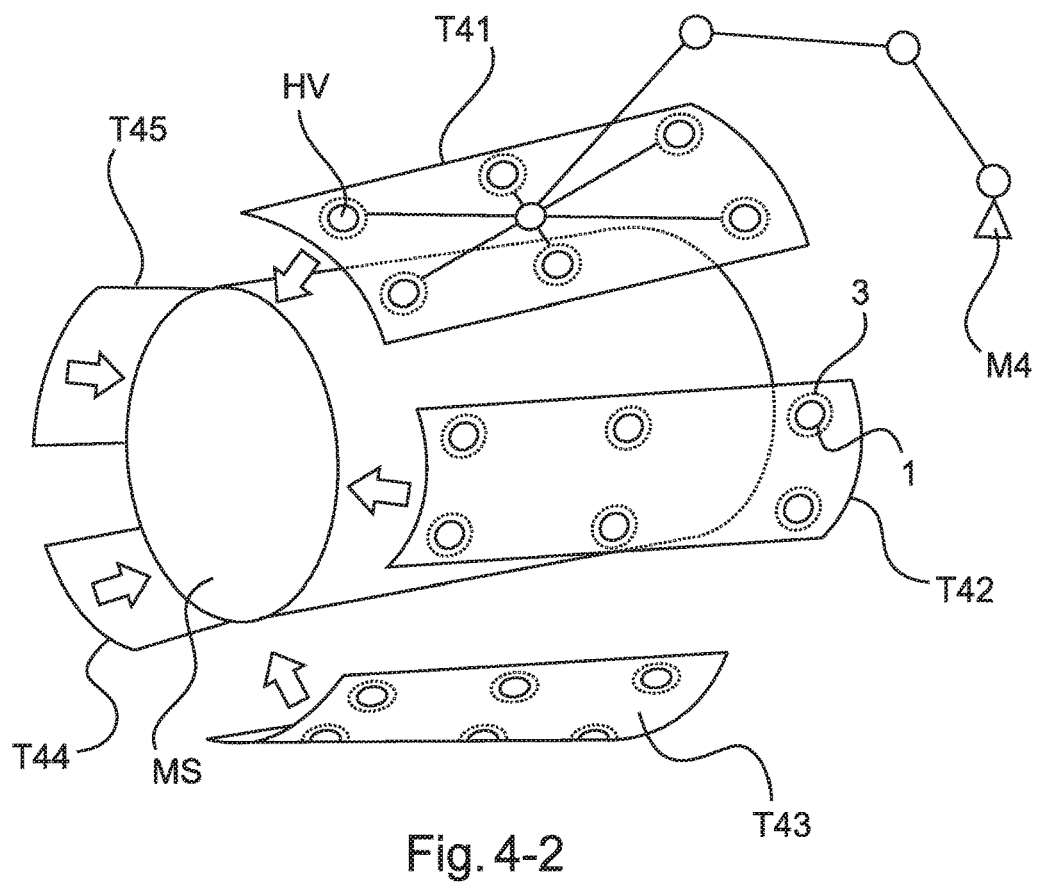

The embodiment shown in FIG. 4-1 shows an already bent component T3, wherein multiple second holding units 3 are provided on its inner surface. A mounting arrangement M3 of a mounting system may be connected with any desired holding unit 1, whereby the bent component T3 may be held at a desired position. In FIG. 4-1, it is possible that the component T3 is already equipped with first and second holding units 1, 3 at multiple positions. In this case, the mounting arrangement M3 grasps one of the first holding units 1 at the surface. However, it is also possible that the component T3 is equipped with merely two holding units 2 at its lower surface and the arm of the mounting arrangement M3 holds a single one of the first holding units 1 with a magnetic field generating device 1, wherein the mounting arrangement M3 arranges the first holding unit 1 at any desired position at the surface of the component T3 and not necessarily opposite to a specific second holding unit 3. Thus, it is even not required to provide multiple first holding units 1 at the upper surface of the component T3.

According to a further advantageous embodiment in FIG. 4-2, multiple bent components T41-T45 may be placed onto a magnetic cylinder MS by a mounting arrangement M4, similar to the component T3 in FIG. 4-1. Each of the components T41-T45 may be provided with multiple holding apparatuses HV and the mounting arrangement M4 may grasp at any desired of the holding apparatuses HV. Respective holding apparatuses HV consisting of a first holding unit 1 and a second holding unit 3 are shown in FIG. 4-2.

In case the counterpart to which the components T41-T45 are to be attached is a magnetic component, as for example the magnetic cylinder MS exemplarily shown in FIG. 4-2, it is also possible that the components T41-T45 are attached to their upper surfaces merely with first holding units 1 with magnetic field generating devices, respectively, as the component onto which they are to be placed may serve as second holding unit due to its magnetic characteristics, which second holding units are provided together as counterpart for all first holding units.

In case a component, like the component T41-T45, comprises holding apparatuses HV at multiple positions (similar to FIG. 4-1 and FIG. 3-1), the respective mounting arrangement M4 may grasp at a desired holding apparatus HV as each individual holding apparatus HV generates a magnetic field. However, it is also possible that a magnetic field generating device is arranged at the component T41-T45 only in the center, for example, and magnetic flux paths to the other holding points are provided, which flux paths generate a magnetic field in a targeted manner at other points. Such arrangements for transmitting or relaying a magnetic field are known to the person skilled in the art.

Even though FIG. 4-2 shows placing (holding and positioning) of areal components T41-T45 with a curved shape onto a magnetic cylinder MS with a curved surface, the embodiment is not limited thereto. That is, if components are to be placed on a magnetic counterpart, like the magnetic cylinder MS, the magnetic counterpart may serve as the second holding unit MS. In this case it is not required that the components T41-T45 are additionally equipped with second holding units, i.e., only one or multiple first holding units with one or multiple magnetic field generating devices must be provided. The embodiment in FIG. 4-2 is, for example, especially advantageous in airplane or rocket production if fuselage components made of a magnetic material must be provided with lining.

Figure 5:
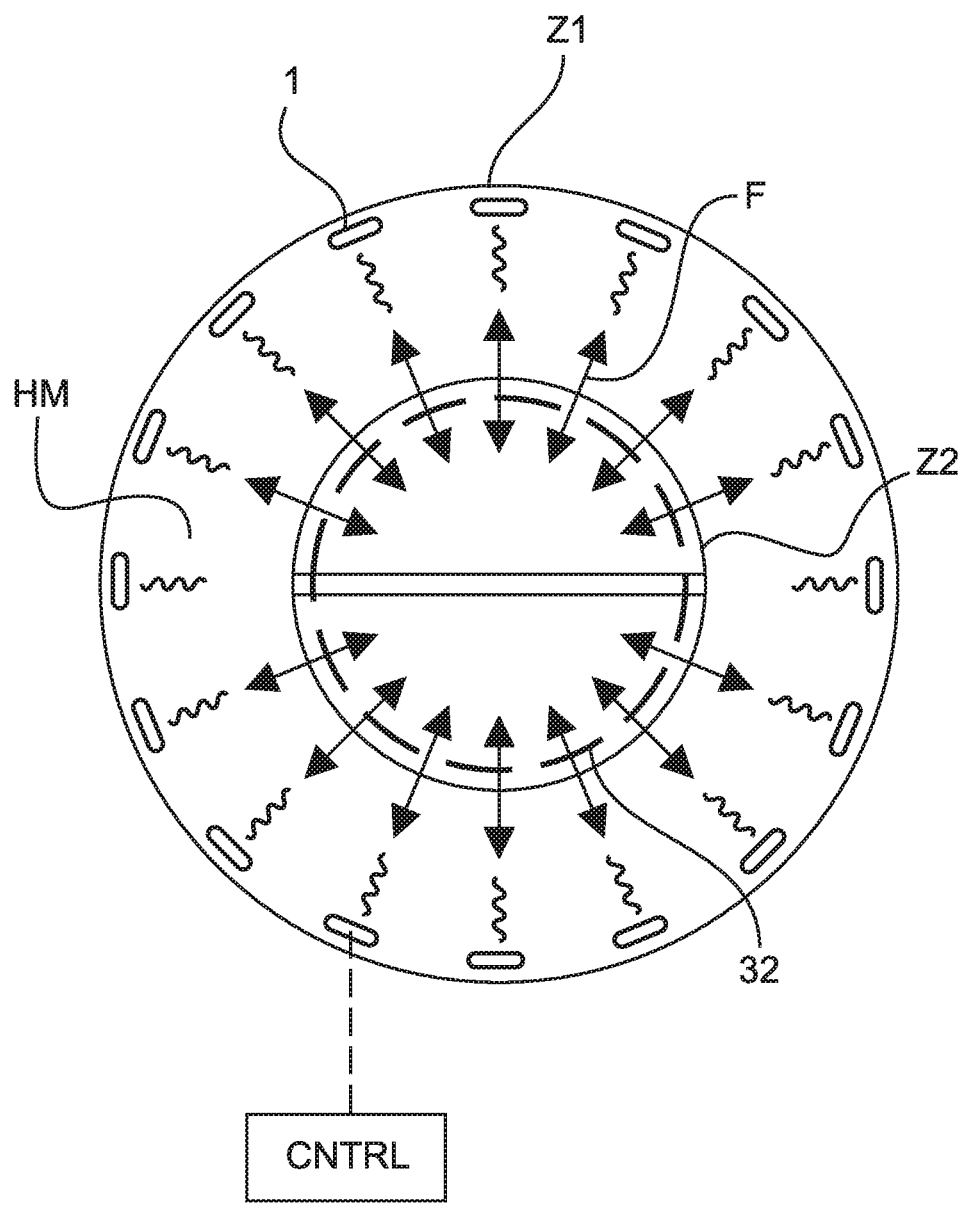
FIG. 5 illustrates holding of a cylindric component Z2 by means of a multitude of second holding units 32 and a multitude of magnetic field generating devices 1 for positioning of cylindrical hollow components according to an advantageous embodiment.

FIG. 5 shows a further embodiment in which the component is a hollow component Z2, wherein one or multitude second magnetic holding units 32 are provided at its inner circumference, wherein the first holding unit 1 with a multitude of magnetic field generating devices 1 is arranged along the outer circumference of the hollow component Z2 at a given distance.

FIG. 5 shows an example in which the first holding unit is formed as hollow cylinder Z1, wherein the multitude of magnetic field generating devices 1 is arranged at the inner circumference of the hollow cylinder Z1. Moreover, in FIG. 5, the hollow component Z2 is exemplarily formed cylindrically and the multitude of second holding units 32 is arranged at the inner circumference of the cylindric hollow component Z2. However, the embodiment is not limited to circular (cylindric) geometries. For example, the hollow component Z2 may represent a fuselage segment for aircraft production. For example, it may be required according to construction specifications that the fuselage segment Z2 has a circular cross section. However, during assembly this is normally not the case due to the own weight, i.e., if such a fuselage segment Z2 should be connected with a further fuselage segment, the shapes must be adapted in terms of the cross section (circular or any other desired to be adapted cross sectional geometry). The multitude of magnetic field generating devices of the first holding units 1 at the circumference of the outer cylinder Z1 are provided, inter alia, for this purpose. If the control arrangement CNTRL controls the intensity and/or the direction of the magnetic field, the differences between the two fuselage segments with respect to the circular shape may be compensated. The to fuselage segments may also be positioned by means of the holding apparatuses HV as a whole with respect to each other, i.e., each fuselage segment is held by a multitude of holding apparatuses HV, as shown in FIG. 5, and is arranged in the longitudinal axis opposite to another fuselage segment (in cross section).

Hence, by means of the holding apparatuses HV according to the embodiment, the deviations in the range of up to 5 cm and typically between 0 and 2.5 cm typically existing in aircraft production for fuselage segment interconnection may be adapted or corrected by means of a specific adjusting of the intensity and/or direction of the magnetic fields.

Above, it has already been mentioned that in case at least some of the second holding units comprise a superconductor, not just an attraction force, but also a repulsive force may be generated. Hence, in the exemplary embodiment in FIG. 5, the fuselage segment may be held (attracted) by means of an attraction force at one point of its circumference while it is pushed with a repulsive force at other points of its circumference. Thereby, differences in the geometry of the cross section can be easily compensated also prior to interconnecting two fuselage segments. Hence, by means of only one attraction force or with a combination of attraction force and repulsive force it becomes possible that the component Z2 is positioned in the position relative to the hollow cylinder Z1.

Even though FIG. 5 shows the second holding units being arranged at the inner circumference of the component Z2 and the magnetic field generating devices 1 being arranged at the inner circumference of the outer cylinder Z1, it is also possible that a reverse arrangement is accomplished, i.e., that the magnetic field generating devices 1 are provided at the inner circumference of the cylinder Z2 and that the second holding units 3 are provided at the circumference of the first cylinder Z1. In case a repulsive force shall be generated, it is not even required that the respective second holding units are arranged at the inner circumference of the component Z2. In this case, the second holding units may also be arranged at the outer circumference of the component (fuselage segment) Z2. Thus, positioning or shaping may be effected with a repulsive force. Consequently, components may be positioned, held, and moved even if access to an interior space of a hollow component is not possible.

Moreover, FIG. 5 shows an embodiment according to which the component Z2 is a hollow component with a circular cross section. However, the embodiment is not limited thereto. The component Z2 with the arrangement of second holding units may have a rectangular, oval, hexagonal, square, or any desired cross section. Similarly, the outer cylinder Z1 provided for the magnetic field generating devices 1 may not necessarily have a circular shape. The magnetic field generating devices 1 may be arranged (even in the embodiment shown in FIG. 5) in a square, rectangular, oval, or other shape as the magnetic field generating devices may be individually controlled with regard to their intensity and direction of the magnetic field, respectively, and, hence, a constant, i.e., same, distance between each first holding unit and each corresponding second holding unit need not be held. It is not required that the same distance is held between all second holding units and the first holding units at all positions at the circumference as the intensity of the magnetic field can be controlled by means of the control arrangement CNTRL.

Figure 6:
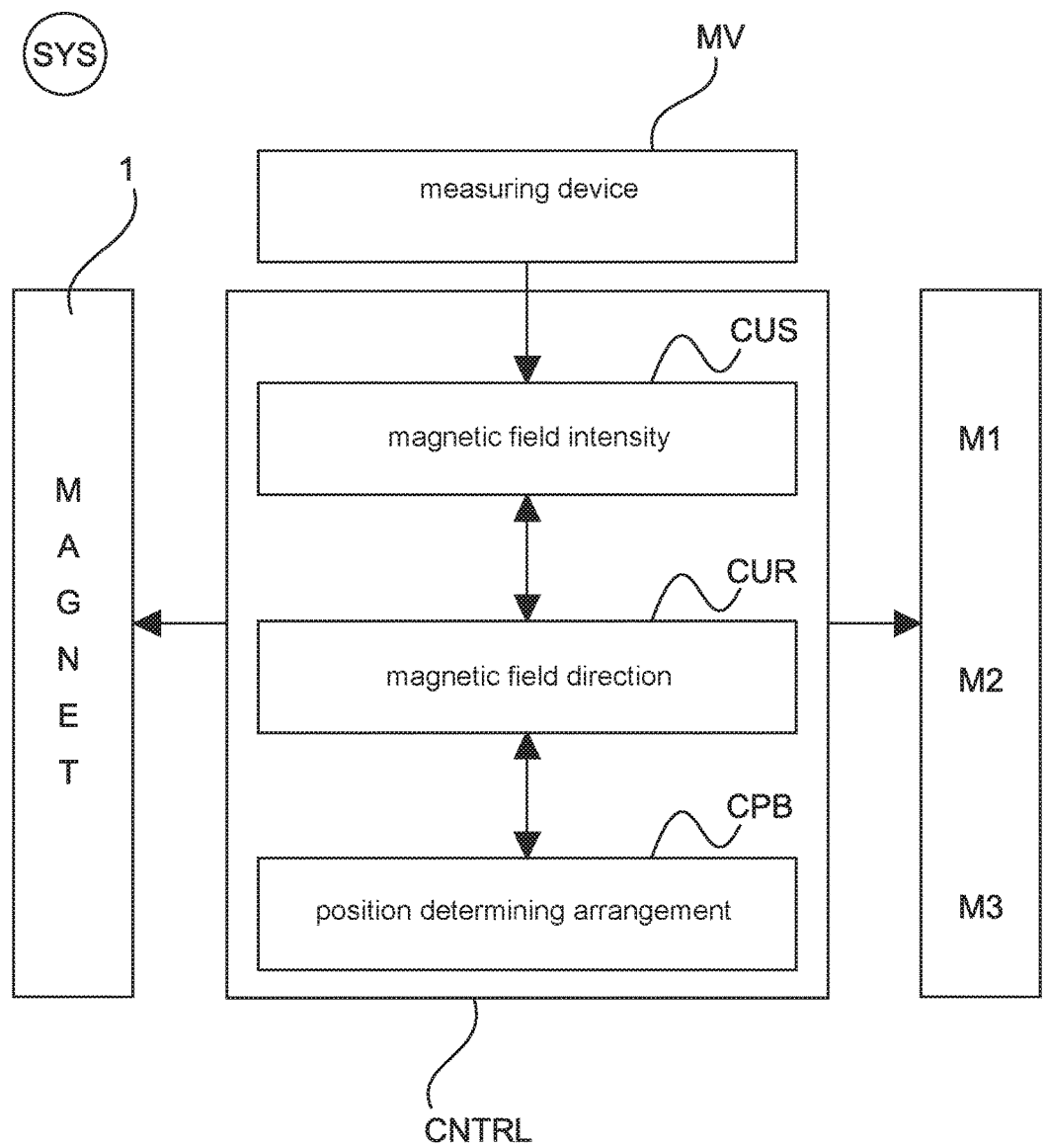
FIG. 6 is a block diagram of the control device CNTRL which is shown in FIG. 1 and FIG. 2.

FIG. 6 shows an embodiment of the entire mounting system SYS of the embodiment with the control arrangement CNTRL, the first holding unit 1 with the magnetic field generating device, multiple mounting arrangements M1, M2, . . . M3 being controlled by the control unit CNTRL, as well as, optionally, a measuring device MV which can measure position data of the components. The measuring device MV may comprise multiple position sensors which are provided at the respective component. The control arrangement CNTRL comprises a position determining arrangement CPB which accomplishes position determination of the holding apparatus HV based on the measurement data of the measuring device MV.

Furthermore, the control arrangement CNTRL comprises a magnetic field direction determining arrangement CNR and a magnetic field intensity determining device CNS. Even though only one magnet is shown in FIG. 6, it is noted that the control arrangement CNTRL may individually control multiple magnetic field generating devices 1 with regard to their intensity and/or direction of the magnetic field, as already described with reference to FIG. 5. Further, it is noted that all units CPB, CNR, and CNS of the control arrangement CNTRL may be appropriately programmed program elements of a computer. The computer may be specifically programmed as to execute the functions of the respective units CNS, CNR, and CPB.

Figure 8:
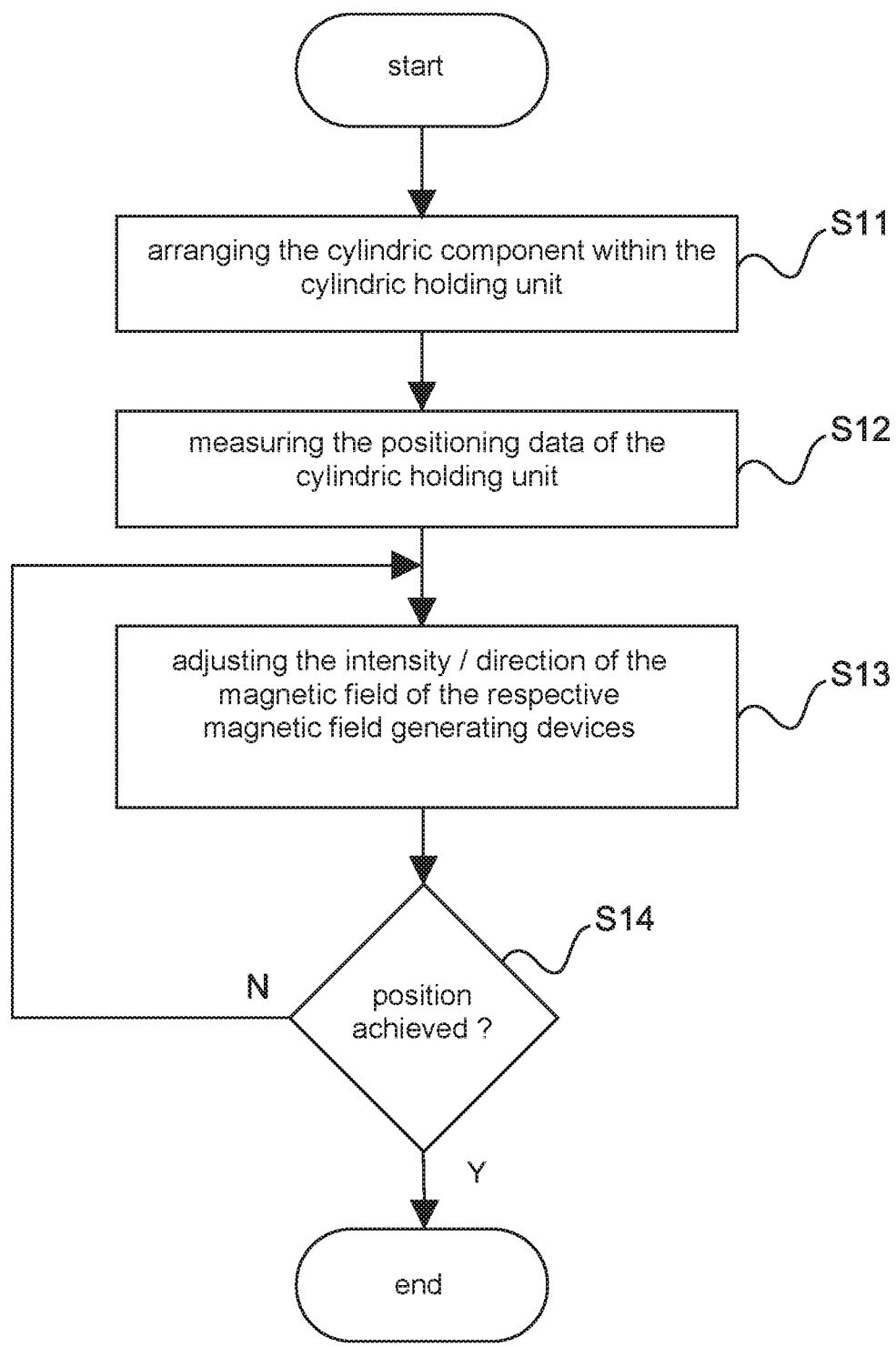
FIG. 8 is a further flow chart of the holding method according to an advantageous embodiment.

FIG. 8 shows an embodiment of the method for holding and positioning components according to the embodiment shown in FIG. 7 in connection with the block diagram of the mounting system SYS in FIG. 6. Prior to step S11 in FIG. 8, and as shown in FIG. 7, controlling is accomplished by the control arrangement CNTRL so that a component is arranged at one or multiple positions between one or multiple first and second holding units of one or multiple holding apparatuses HV. The magnetic field intensity adjusting arrangement CNS controls in step S13 the magnetic field generating devices for generating a magnetic field of a specific intensity so that the component is clamped at the multiple holding apparatuses HV. The holding apparatuses are connected with respective mounting arrangements M1, M2, . . . M3 (robot arms, for example).

In step S11 in FIG. 8, the component is arranged within the cylinder Z1, for example. Then, in step S12, position determining of the component Z2 is accomplished by means of the measuring device MV and the position determining arrangement CPB. The position determining may result in an absolute position or in a relative position with respect to another component with which the component Z2 shall be connected (in aircraft construction typically two fuselage segments). In step S13, the magnetic field intensity adjusting arrangement CNS and/or the magnetic field direction adjusting unit CNR adjusts the magnetic field of the respective magnetic field generating devices 1 so that a position or shape of the component is adjusted or corrected. As already described with reference to FIG. 5, a positioning and a shape correction may be accomplished with an attraction force (and/or repulsive force), so that two fuselage segments can be connected (screwed, welded, etc.) with each other without mechanic stresses which possibly arise as a consequence of an incorrect position or mismatch of the cross section.

In step S14, the position is again determined by means of the measuring device MV and the position determining unit CPB and, if required, the intensity of the magnetic field and/or the direction is adjusted again in step S13. This procedure may be carried out for all magnetic field generating devices individually or collectively (the steps S13-S14 run through) until the predetermined position and/or shape is achieved.

Additionally, it is noted that "comprising" does not exclude any other elements and "a" or "an" does not exclude a plurality. It is further noted that features which are described with reference to one of the above exemplary embodiments may also be used in combination with other features of other exemplary embodiments described above. Reference signs in the claims serve only for explanation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A mounting system for mounting components by means of one or multiple holding apparatuses, each of the holding apparatuses comprising:
   at least one first holding unit with at least one magnetic field generating device for generating a magnetic field; and
   at least one second magnetic holding unit which is arranged at a predetermined distance with respect to the first holding unit for receiving the component, in which second magnetic holding unit a holding force for holding the component between the first holding unit and the second holding unit can be generated by the magnetic field by induction;

wherein at least one of the first holding unit and the second holding unit have curved surfaces such that an areal shaping of the component is achievable by an areal clamping;

wherein the mounting system comprises one or multiple mounting arrangements which are connected with the first holding unit or with the first holding units, respectively; and wherein the mounting arrangement positions the component on a magnetic holder.

2. The mounting system of claim 1, wherein the magnetic field generating device is a magnet, an electric magnet, or a superconducting magnet.

3. The mounting system of claim 1, wherein the second holding unit comprises a ferromagnetic material or a superconducting material.

4. The mounting system of claim 1, wherein the holding force is an attraction force and wherein the component is clampable by means of the attraction force between the first holding unit and the second holding unit.

5. The mounting system of claim 1, wherein a control arrangement is provided which controls the magnetic field generating device as to adjust the intensity and the direction of the generated magnetic field.

6. The mounting system of claim 1, wherein the component is a component for aircraft production.

7. The mounting system according to claim 1, wherein a control arrangement controls the magnetic field generating devices so that the holding force is an attraction force or a repulsive force.

8. A method for holding components during mounting, comprising the following steps:

arranging a component between a first holding unit and a second magnetic holding unit of a holding apparatus, wherein the first holding unit comprises a magnetic field generating device, the magnetic field of which induces a holding force in the second magnetic holding unit;

controlling the intensity and/or the direction of the magnetic field generated by the magnetic field generating device so that the component is held during mounting by means of the generated holding force;

wherein the first holding unit and/or the second holding unit have curved surfaces such that an areal shaping of the component is performed by an areal clamping; and wherein the component is a cylindric component, wherein a multitude of second holding units is provided at the circumference of the cylindric component, and wherein the cylindric component is arranged within a first holding unit which is formed as a hollow cylinder, wherein a multitude of magnetic field generating devices is provided at the circumference of the hollow cylinder, wherein the control arrangement controls the magnetic field generating devices so that the cylindric component is positioned relative to the hollow cylinder.

9. A mounting system for mounting components by means of one or multiple holding apparatuses, each of the holding apparatuses comprising:

at least one first holding unit with at least one magnetic field generating device for generating a magnetic field; and at least one second magnetic holding unit which is arranged at a predetermined distance with respect to the first holding unit for receiving the component, in which second magnetic holding unit a holding force for holding the component between the first holding unit and the second holding unit can be generated by the magnetic field by induction;

wherein at least one of the first holding unit and the second holding unit have curved surfaces such that an areal shaping of the component is achievable by an areal clamping;

wherein the component is a hollow component, wherein one or multitude second magnetic holding units are provided at its inner circumference, wherein the first holding unit with a multitude of magnetic field generating devices is arranged at a given distance with respect to the outer circumference of the hollow component; and wherein the first holding unit is a hollow cylinder, wherein the multitude of magnetic field generating devices is arranged at the circumference of the hollow cylinder, wherein the hollow component is cylindrical and a multitude of second holding units is arranged at the inner circumference of the cylindric hollow component.

* * * * *